(No Model.)
G. W. HALL.
JOINT FOR STEAM PIPES IN PAPER MAKING MACHINES.
No. 309,457. Patented Dec. 16, 1884.
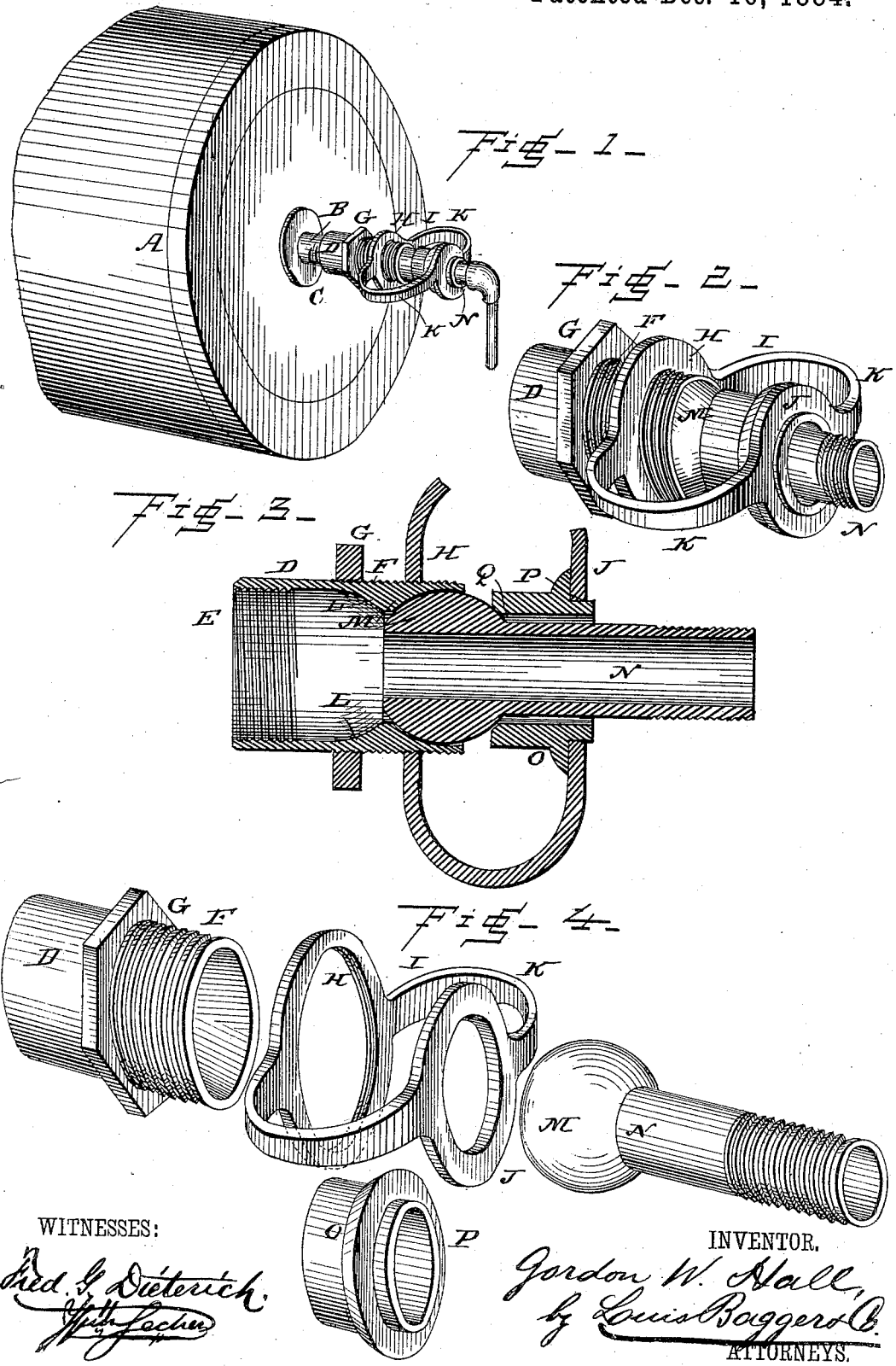
WITNESSES:
INVENTOR.
Gordon W. Hall,
by Louis Bagger & Co.
ATTORNEYS.

United States Patent Office.

GORDON W. HALL, OF LOCKPORT, NEW YORK.

JOINT FOR STEAM-PIPES IN PAPER-MAKING MACHINES.

SPECIFICATION forming part of Letters Patent No. 309,457, dated December 16, 1884.

Application filed May 23, 1884. (No model.)

*To all whom it may concern:*

Be it known that I, GORDON W. HALL, a citizen of the United States, and a resident of Lockport, in the county of Niagara and State of New York, have invented certain new and useful Improvements in Joints for Steam-Pipes in Paper-Making Machines; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a portion of a drying-cylinder of a paper-making machine, showing my improved pipe-joint in position. Fig. 2 is a perspective view of the joint. Fig. 3 is a longitudinal section of the same, and Fig. 4 is a perspective view of the several parts of the joint detached.

Similar letters of reference indicate corresponding parts in all the figures.

My invention has relation to joints for steam and other pipes in which a certain amount of flexibility is desired, and more particularly to joints for the steam-pipes for drying-cylinders or similar cylinders in paper-making machinery; and it consists in the improved construction and combination of parts of the same, as hereinafter more fully described and claimed.

In the accompanying drawings, the letter A indicates a portion of the drying-cylinder of a paper-making machine, and B one of the hollow trunnions upon which it is journaled, and through which the steam passes, and the outer end of this trunnion or journal is screw-threaded at C, and provided with a tube, D, fitting with its female threaded inner end, E, upon the trunnion, while its outer end, F, is provided with a male screw-thread, upon which a nut, G, and the inner collar, H, of a spring yoke or coupling, I, fits. This yoke or coupling consists of the said collar $i$ and a smooth collar, J, which collars are connected by means of curved arms K, the perforations of the collars registering with each other, and the outer end of the threaded tube, upon which the inner collar of the spring-yoke fits, is formed upon its inner side into a concave spherical seat, L, upon which a spherical bulb, M, upon the inner end of the steam-conveying tube N fits and may turn. A collar, O, having a reduced portion, P, fitting and turning in the smooth collar of the spring-yoke, forms a concave spherical seat, Q, at its inner enlarged end, which seat bears against the outer portion of the spherical bulb, causing it to bear against both of its seats, and the perforation of the collar is larger than the steam-conveying pipe, allowing the same to play within it. It will thus be seen that by screwing the spring-yoke in upon the threaded tube the seats may be brought to bear tightly upon the spherical bulb, forming a steam-tight joint, and that at the same time the seats may revolve upon the spherical bulb and lateral play or rocking play be allowed for the steam-conveying pipe, thus obviating the necessity of having flexible steam-conveying pipes or having yielding packing in the coupling, the spring-yoke being sufficiently yielding to allow the necessary rocking incident with machinery of this kind.

Having thus described my invention, I claim and desire to secure by Letters Patent of the United States—

1. The combination of the spring-yoke with the smooth collar, the spherical bulb or ball, and the socket or tube, as and for the purpose shown and set forth.

2. The combination of the spring-yoke, the ball or spherical bulb, and a sliding collar, as and for the purpose shown and set forth.

3. In a joint or coupling for steam-pipes in drying-cylinders for paper-machines, the combination of a tube fitting upon the cylinder-journal, and formed with a spherical concave seat at its outer end, a collar formed with a spherical concave seat at its inner end, a steam-conveying pipe provided with a spherical bulb at its outer end fitting between the bearings or seats, and means, substantially as described, for flexibly connecting the two seats, as and for the purpose shown and set forth.

4. The combination of the threaded tube formed with a spherical concave seat at its outer end, the spring-yoke formed with a threaded collar, a smooth collar and elastic connecting-arms, a collar fitting in the smooth collar of the yoke and formed with a spherical concave bearing at its inner end, and the steam-conveying pipe formed with a spherical bulb at its inner end, as and for the purpose shown and set forth.

In testimony that I claim the foregoing as my own I have hereunto affixed my signature in presence of two witnesses.

GORDON W. HALL.

Witnesses:
AMBROSE S. BEVERLY,
ISRAEL N. HOWE.